United States Patent
Nagano

(10) Patent No.: US 6,628,223 B2
(45) Date of Patent: Sep. 30, 2003

(54) RESISTANCE CHANGEABLE DEVICE FOR DATA TRANSMISSION SYSTEM

(75) Inventor: Hideo Nagano, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/135,381

(22) Filed: May 1, 2002

(65) Prior Publication Data

US 2003/0080891 A1 May 1, 2003

(30) Foreign Application Priority Data

Nov. 1, 2001 (JP) ......................................... 2001-336812

(51) Int. Cl.[7] ................................................ H03M 1/00
(52) U.S. Cl. ........................ 341/155; 326/30; 333/17.3; 333/33
(58) Field of Search ........................ 341/155; 333/17.1, 333/17.2, 17.3, 32, 33, 34; 326/30

(56) References Cited

U.S. PATENT DOCUMENTS 5,398,261 A * 3/1995 Marbot ......................... 333/32

2002/0027480 A1 * 3/2002 Thompson et al. ........... 333/17.3

FOREIGN PATENT DOCUMENTS

| JP | 11-340810 A | * 12/1999 | ................. 333/17.3 |
| JP | 2000-183717 | 6/2000 | |

* cited by examiner

Primary Examiner—Howard L. Williams
(74) Attorney, Agent, or Firm—Burns, Doane, Swecker & Mathis, LLP

(57) ABSTRACT

On a semiconductor chip, ends of a plurality of resistive elements of a pull-up resistor unit disposed in parallel to each other are connected to a power source, other ends of the resistive elements are connected to a line connecting a signal input terminal and a receiving end device disposed on the semiconductor chip, and the line is connected to the ground through an external resistor disposed on the outside of the semiconductor chip. A current flows from the power source to the ground, and a node voltage depending on a resistance value of the external resistor and a composite resistance of the pull-up resistor unit is applied to a node between the line and the external resistor. The composite resistance of the pull-up resistor unit functioning as a termination resistor is corrected to an expected value according to the node voltage.

8 Claims, 6 Drawing Sheets

RESISTANCE CHANGEABLE DEVICE FOR DATA TRANSMISSION SYSTEM

BACKGROUND OF THE INVENTION

1. Field of the Invention

The present invention relates to a resistance changeable device used for a data transmission system having a plurality of data transmission channels, and more particularly to a resistance changeable device used for a receiving end device which is used for a data transmission system requiring of the adjustment of an input impedance. Also, the present invention relates to a resistance changeable device usable for a differential output circuit such as a low voltage differential signaling (LVDS) system which is used for a notebook-sized personal computer and is characterized by data transmission at high speed, low voltage and low noise.

2. Description of Related Art

FIG. 6 is a view of an equivalent circuit of a conventional data transmission system, and FIG. 7 is a view of an equivalent circuit of another conventional data transmission system. In FIG. 6 and FIG. 7, 1 indicates a transmission line formed of a single data bus, 2 indicates a transmitting end device, and 3 indicates a receiving end device. Also, 4 indicates a transmission line formed of two data buses, 5 indicates a transmitting end device, and 6 indicates a receiving end device in which noise is reduced by performing differential amplification.

FIG. 8 is a view of an equivalent circuit of a conventional data transmission system in which impedance matching is performed. In FIG. 8, 11 indicates a plurality of transmission lines formed of a plurality of data buses respectively, 12 indicates a transmitting end device, 13 indicates a receiving end device, and 14 indicates a termination resistor connected to each transmission line 11 on the outside of the corresponding receiving end device 13.

Next, operations of the conventional data transmission systems will be described below.

In general, in cases where the transmission delay time in the transmission line 1 or 4 is longer than a rise time or a fall time of a transmitted signal, the transmission line 1 or 4 is regarded as a distributed constant line, and it is required to consider influence of noise such as reflection of the transmitted signal. In particular, in case of a high speed data transmission system, the transmission delay time in a transmission line is often longer than a rise time or a fall time of a transmitted signal, and it is important to protect the data transmission system from noise such as reflection of the signal caused by the impedance mismatching in the transmission line.

Also, a termination resistor is generally used to obtain the impedance matching in the transmission line. As shown in FIG. 8, in cases where the impedance matching among an output impedance Z1 of the transmitting end device 12, a characteristic impedance Z0 of the transmission line 11 and a resistance value ZL of the termination resistor 14 is obtained, no reflection of the signal occurs fundamentally. In other words, it is important to match the resistance value ZL of the termination resistor 14 with the characteristic impedance Z0 of the transmission line 11.

However, in a general high speed data transmission system, a multi-bit bus such as an 8-bit bus or a 16-bit bus is often disposed as a plurality of data buses respectively connecting the transmitting end device 12 and the receiving end device 13. Therefore, in cases where a plurality of termination resistors 14 disposed on the outside of the receiving end device 13 are connected to all input terminals of the receiving end device 13 respectively, problems have arisen that the number of constituent elements disposed on a substrate (or a semiconductor chip), on which the receiving end device is disposed, is increased, the manufacturing cost of the data transmission system is increased and an element disposing area of the substrate is increased.

In contrast, there is a case where the termination resistors 14 are disposed on the inside of the receiving end device 13 to reduce both the manufacturing cost of the data transmission system and the element disposing area of the substrate. However, in this case, because it is difficult to uniformly form the termination resistors 14 in the actual manufacturing so as to set the termination resistors 14 to the same resistance value as each other, there is high probability that the impedance mismatching occurs between the transmitting end device 12 and the receiving end device 13. Also, in cases where the termination resistors 14 are disposed on the inside of the receiving end device 13, each termination resistor 14 is fixed to a resistance value near to a desired resistance value. Therefore, a problem has arisen that the receiving end device 13 having one termination resistor 14 cannot be used for another data transmission system in which a characteristic impedance of a transmission line differs from the characteristic impedance Z0 of the transmission line 11 originally connected to the receiving end device 13. Therefore, in the prior art, in a viewpoint of data transmission characteristics, it is advantageous that a plurality of termination resistors adjusted according to the characteristic impedances Z0 of the transmission line 11 respectively are disposed on the outside of the receiving end device 13.

SUMMARY OF THE INVENTION

An object of the present invention is to provide, with due consideration to the drawbacks of the conventional data transmission systems, a resistance changeable device in which a resistance value of a termination resistor disposed on the inside of a semiconductor chip is adjustable so as to reduce both a manufacturing cost of a data transmission system and an element disposing area of the semiconductor chip and so as to keep the impedance matching of the data transmission system to a degree of the impedance matching obtained on the assumption that the termination resistor is disposed on the outside of the semiconductor chip.

The object is achieved by the provision of a resistance changing device comprising a pull-up resistor unit having a plurality of resistive elements of which first ends are connected to a high electric potential source, a switching circuit unit having a plurality of switches of which first ends are connected to second ends of the resistive elements of the pull-up resistor unit respectively and second ends are connected to a signal input terminal, a mode switch of which a first end is connected to the signal input terminal and which is switched on in response to a significant mode signal input to a mode setting terminal and is switched off in response to an insignificant mode signal input to the mode setting terminal, a reference voltage producing circuit for producing a reference voltage, a voltage-to-current converting unit, which has an NMOS transistor having a drain connected to a second end of the mode switch, an external resistor disposed outside a chip and having both an end connected to a source of the NMOS transistor and another end connected to a low electric potential source and an operational amplifier having a first input terminal connected to the reference voltage producing circuit, a second input terminal connected to a node between the NMOS transistor and the external resistor and an output terminal connected to a gate of the NMOS transistor, for converting the reference voltage received by the operational amplifier from the reference voltage producing circuit into a current flowing through the NMOS transistor according to a resistance value of the external resistor, an analog-to-digital converting circuit for converting a node voltage at a node between the mode switch and the NMOS transistor of the voltage-to-current converting unit into a digital measured value code, an expected value holding unit for holding a digital expected value code denoting an expected value of a composite resistance of the pull-up resistor unit, a decoding circuit for producing a correction code according to both the digital measured value code obtained by the analog-to-digital converting circuit and the digital expected value code held by the expected value holding unit, a latch circuit for outputting the correction code produced by the decoding circuit in response to the significant mode signal input to the mode setting terminal and disregarding the correction code in response to the insignificant mode signal input to the mode setting terminal, and a selector circuit for performing an on-off control for each of the switches of the switching circuit unit according to the correction code output from the latch circuit so as to correct the composite resistance of the pull-up resistor unit to the expected value.

In the above configuration, a prescribed number of switches are initially turned on by the selector circuit. Thereafter, when a significant mode signal is input to the mode setting terminal, the mode switch is turned on, a current flows from the high electric potential source to the low electric potential source through resistor elements connected to the switches turned on, the mode switch, the NMOS transistor and the external resistor of the voltage-to-current converting unit, and a node voltage is applied to the node between the mode switch and the NMOS transistor of the voltage-to-current converting unit. The node voltage is converted into a digital measured value code by the analog-to-digital converting circuit, the digital measured value code is compared with the digital expected value code denoting an expected value of a composite resistance of the pull-up resistor unit by the decoding circuit to obtain an error code, the error code passes through the latch circuit, and each switch of the switching circuit unit is turned on or turned off according to the correction code by the selector circuit. Therefore, the composite resistance of the pull-up resistor unit functioning as a termination resistor is corrected to the expected value. Thereafter, when an insignificant mode signal is input to the mode setting terminal, the mode switch is turned off, and no correction code passes through the latch circuit. Therefore, the composite resistance of the pull-up resistor unit corrected is kept at the expected value.

Accordingly, because the pull-up resistor unit is disposed on the inside of the chip as a termination resistor, a manufacturing cost of a data transmission system and an element disposing area of the chip can be reduced.

Also, because the composite resistance of the pull-up resistor unit functioning as a termination resistor can be accurately set to the expected value of the composite resistance, the impedance matching of the data transmission system can be kept to a degree of the impedance matching obtained on the assumption that the termination resistor is disposed on the outside of the semiconductor chip.

Also, because the external resistor is disposed on the outside of the chip, the resistance value of the external resistor can be arbitrarily changed. Therefore, the resistance value of the termination resistor indicated by the composite resistance of the pull-up resistor unit can be easily adjusted.

Also, the resistive elements of the pull-up resistor unit can function as the termination resistor of a receiving end device.

The object is also achieved by the provision of a resistance changing device comprising a reference voltage producing circuit for producing a reference voltage, a voltage-to-current converting unit, which has an external resistor disposed outside a chip and having a first end connected to a high electric potential source, a PMOS transistor having a source connected to a second end of the external resistor and an operational amplifier having a first input terminal connected to a node between the PMOS transistor and the external resistor, a second input terminal connected to the reference voltage producing circuit, and an output terminal connected to a gate of the PMOS transistor, for converting the reference voltage received by the operational amplifier from the reference voltage producing circuit into a current flowing through the PMOS transistor according to a resistance value of the external resistor, a mode switch of which a first end is connected to a drain of the PMOS transistor of the voltage-to-current converting unit and a second end is connected to a signal input terminal and which is switched on in response to a significant mode signal input to a mode setting terminal and is switched off in response to an insignificant mode signal input to the mode setting terminal, a switching circuit unit having a plurality of switches of which first ends are connected to the signal input terminal, a pull-down resistor unit having a plurality of resistive elements of which first ends are connected to second ends of the switches of the switching circuit unit respectively and second ends are connected to a low electric potential source, an analog-to-digital converting circuit for converting a node voltage at a node between the mode switch and the PMOS transistor of the voltage-to-current converting unit into a digital measured value code, an expected value holding unit for holding a digital expected value code denoting an expected value of a composite resistance of the pull-down resistor unit, a decoding circuit for producing a correction code according to both the digital measured value code obtained by the analog-to-digital converting circuit and the digital expected value code held by the expected value holding unit, a latch circuit for outputting the correction code produced by the decoding circuit in response to the significant mode signal input to the mode setting terminal and disregarding the correction code in response to the insignificant mode signal input to the mode setting terminal, and a selector circuit for performing an on-off control for each of the switches of the switching circuit unit according to the correction code output from the latch circuit so as to correct the composite resistance of the pull-down resistor unit to the expected value.

In the above configuration, a prescribed number of switches are initially turned on by the selector circuit. Thereafter, when a significant mode signal is input to the mode setting terminal, the mode switch is turned on, a current flows from the high electric potential source to the low electric potential source through the external resistor and the PMOS transistor of the voltage-to-current converting unit, the mode switch and resistor elements connected to the switches turned on, and a node voltage is applied to the node between the mode switch and the PMOS transistor of the voltage-to-current converting unit. The node voltage is converted into a digital measured value code by the analog-to-digital converting circuit, the digital measured value code is compared with the digital expected value code denoting an expected value of a composite resistance of the pull-down resistor unit by the decoding circuit to obtain an error code, the error code passes through the latch circuit, and each switch of the switching circuit unit is turned on or turned off according to the correction code by the selector circuit. Therefore, the composite resistance of the pull-down resistor unit is corrected to the expected value. Thereafter, when an insignificant mode signal is input to the mode setting terminal, the mode switch is turned off, and no correction code passes through the latch circuit. Therefore, the composite resistance of the pull-down resistor unit corrected is kept at the expected value.

Accordingly, because the pull-down resistor unit is disposed on the inside of the chip as a termination resistor, a manufacturing cost of a data transmission system and an element disposing area of the chip can be reduced.

Also, because the composite resistance of the pull-down resistor unit functioning as a termination resistor can be accurately set to the expected value, the impedance matching of the data transmission system can be kept to a degree of the impedance matching obtained on the assumption that the termination resistor is disposed on the outside of the semiconductor chip.

Also, because the external resistor is disposed on the outside of the chip, the resistance value of the external resistor can be arbitrarily changed. Therefore, the resistance value of the termination resistor indicated by the composite resistance of the pull-down resistor unit can be easily adjusted.

Also, the resistive elements of the pull-down resistor unit can function as the termination resistor of a receiving end device.

It is preferred that the resistance changing device further comprises a replica circuit connected to a second signal input terminal and having the same configuration as a set of the pull-up resistor unit and the switching circuit unit, wherein the first end of the mode switch is connected to the second signal input terminal, and an on-off control for each of a plurality of switches of the replica circuit is performed by the selector circuit so as to correct a composite resistance of the replica circuit to an expected value.

Therefore, even though a plurality of data buses are connected with a receiving end device disposed on the inside of the chip to input a plurality of signals transmitted through the data buses to a plurality of signal input terminals of the receiving end device, a resistance value of the termination resistor indicated by the composite resistance of the pull-up resistor unit can be disposed for each data bus.

It is preferred that the resistance changing device further comprises a replica circuit connected to a second signal input terminal and having the same configuration as a set of the pull-down resistor unit and the switching circuit unit, wherein the second end of the mode switch is connected to the second signal input terminal, and an on-off control for each of a plurality of switches of the replica circuit is performed by the selector circuit so as to correct a composite resistance of the replica circuit to an expected value.

Therefore, even though a plurality of data buses are connected with a receiving end device disposed on the inside of the chip to input a plurality of signals transmitted through the data buses to a plurality of signal input terminals of the receiving end device, a resistance value of the termination resistor indicated by the composite resistance of the pull-down resistor unit can be disposed for each data bus.

It is also preferred that the resistive elements of the pull-up resistor unit are formed of a plurality of MOS transistors, and the MOS transistors turned on have resistances respectively.

Therefore, an area occupied by the pull-up resistor unit on the chip can be reduced.

It is also preferred that the resistive elements of the pull-down resistor unit are formed of a plurality of MOS transistors, and the MOS transistors turned on have resistances respectively.

Therefore, an area occupied by the pull-down resistor unit on the chip can be reduced.

It is also preferred that the expected value holding unit is formed of a register circuit, and the digital expected value code arbitrarily set is held in the register circuit.

Therefore, the composite resistance of the pull-up resistor unit can be changed to the expected value arbitrarily set as a termination resistance.

It is also preferred that the expected value holding unit is formed of a register circuit, and the digital expected value code arbitrarily set is held in the register circuit.

Therefore, the composite resistance of the pull-down resistor unit can be changed to the expected value arbitrarily set as a termination resistance.

DETAILED DESCRIPTION OF THE PREFERRED EMBODIMENTS

Embodiments of the present invention will now be described with reference to the accompanying drawings.

Embodiment 1

Figure 1:
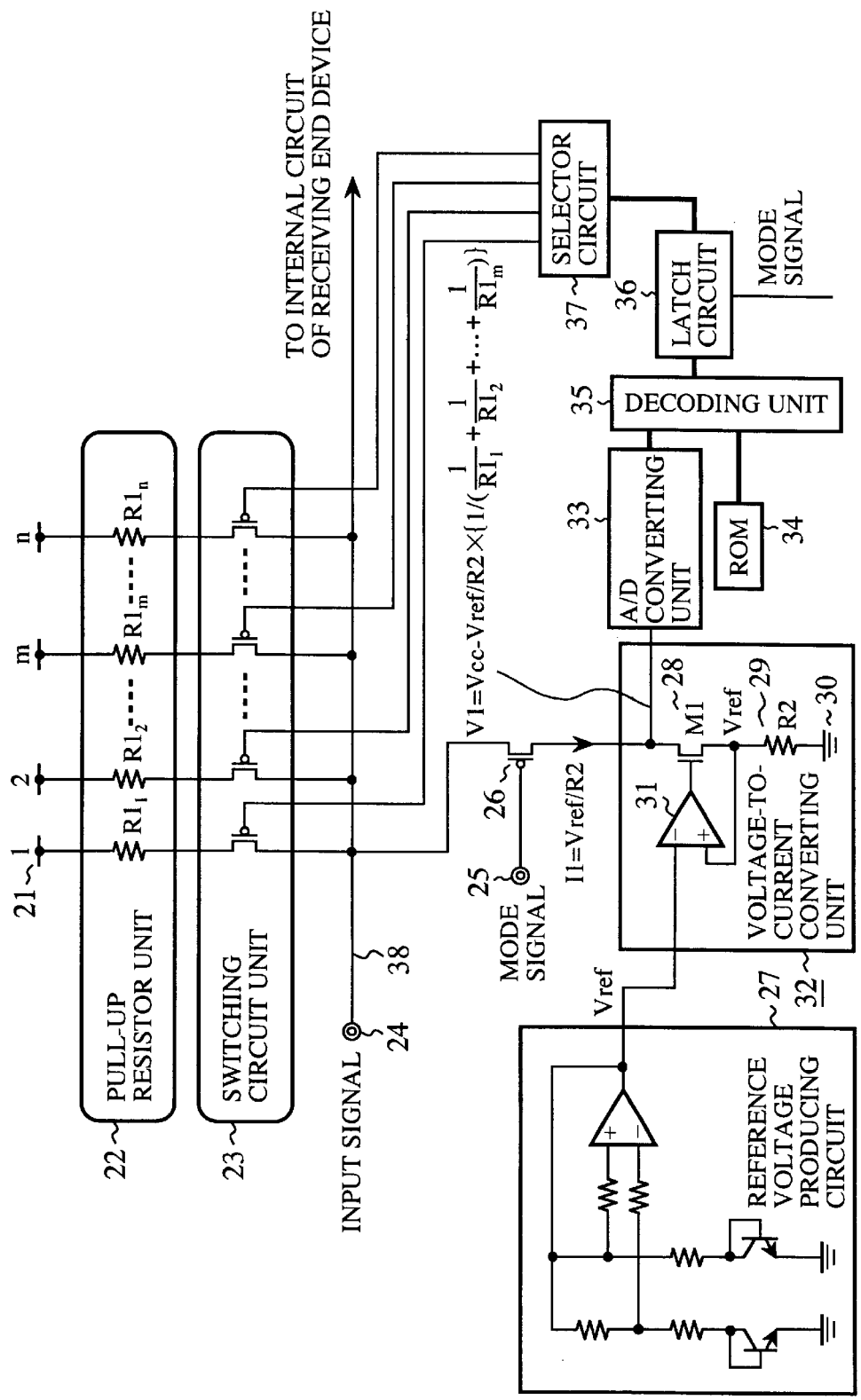
FIG. 1 is a circuit view of a resistance changing device according to a first embodiment of the present invention.

FIG. 1 is a circuit view of a resistance changing device according to a first embodiment of the present invention. In FIG. 1, 21 indicates an electric power source (or a high electric potential source) set to a source voltage Vcc. 22 indicates a pull-up resistor unit in which a plurality of resistive elements (for example, resistors) tried to be formed in the same size as each other are disposed in parallel to each other. The resistive elements have resistance values $R1_1$, $R1_2$, - - - and $R1_n$ (n denotes an integral number equal to or higher than 2) slightly different from each other, and the resistance values of the resistive elements are distributed around a desired resistance value R1. One end of each resistive element is connected to the electric power source 21. 23 indicates a switching circuit unit in which a plurality of P-channel metal oxide semiconductor (PMOS) transistors (or a plurality of switches) are disposed in parallel to each other. A source of each PMOS transistor is connected to the other end of the corresponding resistive element of the pull-up resistor unit 22. 24 indicates a signal input terminal at which an input signal transmitted from a transmitting end device (not shown) through a transmission line (not shown) is received. Drains of the PMOS transistors of the switching circuit unit 23 are connected to a line 38 connecting the signal input terminal 24 and an internal circuit of a receiving end device (not shown). The receiving end device is disposed on a semiconductor chip. 25 indicates a mode setting terminal at which a mode signal is received. 26 indicates a PMOS transistor (or a mode switch) in which a gate is connected to the mode setting terminal 25 and a source is connected to the line 38 connecting the signal input terminal 24 and the internal circuit of the receiving end device.

27 indicates a reference voltage producing circuit in which a reference voltage Vref is produced. The reference voltage producing circuit 27 is disposed on the inside of the semiconductor chip and has a band gap circuit comprising a mirror circuit of one stage and an operation amplifier. 28 indicates an N-channel metal oxide semiconductor (NMOS) transistor in which a drain is connected to a drain of the PMOS transistor 26. 29 indicates an external resistor having a resistance value R2 which is disposed on the outside of the semiconductor chip. One end of the external resistor 29 is connected to a source of the NMOS transistor 28, and the other end of the external resistor 29 is connected to a ground (or a low electric potential source) 30. 31 indicates an operational amplifier. An inversion (−) input terminal of the operational amplifier 31 is connected to the reference voltage producing circuit 27, a non-inversion (+) input terminal of the operational amplifier 31 is connected to a node between the NMOS transistor 28 and the external resistor 29. A voltage-to-current converting unit 32 comprises the NMOS transistor 28, the external resistor 29 and the operational amplifier 31. In the voltage-to-current converting unit 32, the reference voltage Vref produced in the reference voltage producing circuit 27 is converted into a current flowing through both the pull-up resistor unit 22 and the NMOS transistor 28 in dependence on the resistance value R2 of the external resistor 29.

33 indicates an analog-to-digital (A/D) converting circuit in which a node voltage V1 at a node between the PMOS transistor 26 and the NMOS transistor 28 is converted into a digital measured value code. 34 indicates a read only memory (ROM) circuit (or an expected value holding unit) in which a digital expected value code is stored in advance. The digital expected value code denotes an expected value of a composite resistance of the pull-up resistor unit 22. 35 indicates a decoding circuit in which the digital measured value code obtained from the node voltage V1 in the A/D converting circuit 33 is compared with the digital expected value code stored in the ROM circuit 34 to obtain an error value indicating a difference between the digital measured value code and the digital expected value code and a correction code is produced according to the error value. The correction code is used to correct the composite resistance of the pull-up resistor unit 22 to the expected value of the composite resistance.

36 indicates a latch circuit in which the correction code produced in the decoding circuit 35 is output or disregarded according to the mode signal received in the mode setting terminal 25. 37 indicates a selector circuit connected to a gate of each PMOS transistor of the switching circuit unit 23. An on-off control is performed in the selector circuit 37 for each PMOS transistor of the switching circuit unit 23 according to the correction code output from the latch circuit 36.

Next, an operation of the resistance changing device will be described below. In the first embodiment, the pull-up resistor unit 22 is disposed as a termination resistor in the semiconductor chip in which a receiving end device is disposed, each PMOS transistor of the switching circuit unit 23 is turned on or turned off under the control of the selector circuit 37, and a desired resistance of the termination resistor is obtained.

The operation is described in detail in an example case where an expected value of the resistance of the termination resistor is set to 100 Ω in advance. In this case, to roughly set a composite resistance of the pull-up resistor unit 22 to 100 Ω in an initial setting operation, a prescribed number of PMOS transistors, of which the number is m (m≦n, n denotes the number of all resistive elements of the pull-up resistor unit 22, and R1/m=100 Ω), are selected from among the all PMOS transistors of the switching circuit unit 23 and are turned on under the control of the selector circuit 37. Therefore, a composite resistance (R1/m) of m resistive elements of the pull-up resistor unit 22 corresponding to the turned-on PMOS transistors is roughly set to 100 Ω. In other words, because each resistive element is not accurately set to the desired resistance value R1 in the manufacturing step of the pull-up resistor unit 22, the composite resistance of the resistive elements corresponding to the turned-on PMOS transistors usually differs from 100 Ω.

Therefore, an adjusting operation for accurately setting the composite resistance to the expected value (100 Ω) is performed. In detail, a mode signal (or a significant mode signal) set to a low level is input to the mode setting terminal 25. Therefore, the PMOS transistor 26 is turned on in response to the mode signal of the low level, a current I1 flowing through the pull-up resistor unit 22 passes through the PMOS transistor 26, and a node voltage V1 depending on both the current I1 and the composite resistance of the pull-up resistor unit 22 is applied to the node between the PMOS transistor 26 and the NMOS transistor 28.

Here, because the reference voltage producing circuit 27 comprises the band gap circuit disposed in the semiconductor chip, the reference voltage Vref output from the reference voltage producing circuit 27 can be accurately set even though temperature or voltage in the reference voltage producing circuit 27 is slightly changed or constituent elements of the reference voltage producing circuit 27 are not accurately formed in the manufacturing process. Also, the external resistor 29 is disposed on the outside of the semiconductor chip. Therefore, even though the operational amplifier 31 of the voltage-to-current converting unit 32 is not accurately formed in the manufacturing process or temperature or voltage in the operational amplifier 31 is slightly changed, the node between the NMOS transistor 28 and the external resistor 29 is set to the reference voltage Vref by the function of the operational amplifier 31, and the current I1 depending on the resistance value R2 and the reference voltage Vref flows through the NMOS transistor 28. In other words, the reference voltage Vref is accurately converted into the current I1 by the operational amplifier 31.

The current I1 and the node voltage V1 are expressed according to following equations.

$$I1 = Vref/R2$$

$$V1 = Vcc - I1 \times \{1/(1/R1_1 + 1/R1_2 + \cdots + 1/R1_m)\}$$

Therefore, the node voltage V1 depending on the reference voltage Vref, the resistance value R2 and the composite resistance of the pull-up resistor unit 22 is expressed according to a following equation.

$$V1=Vcc-(Vref/R2)-\{1/(1/R1_1+1/R1_2+\cdots+1/R1_m)\}$$

Thereafter, the node voltage V1 between the PMOS transistor 26 and the NMOS transistor 28 is actually measured and is converted into a digital measured value code in the A/D converting circuit 33. In the ROM circuit 34, a digital expected value code denoting an expected node voltage Vcc−Vref/R2×100 Ω calculated from the expected value 100 Ω of the composite resistance of the pull-up resistor unit 22 is stored in advance.

Thereafter, in the decoding circuit 35, the digital measured value code obtained from the node voltage V1 in the A/D converting circuit 33 is compared with the digital expected value code stored in the ROM circuit 34, a difference between the digital measured value code and the digital expected value code is calculated as an error value, and a correction code is produced according to the error value to correct the composite resistance of the pull-up resistor unit 22 to the expected value 100 Ω of the composite resistance according to the correction code.

Thereafter, in the latch circuit 36, the correction code obtained in the decoding circuit 35 is promptly output to the selector circuit 37 in response to the mode signal of the low level input to the mode setting terminal 25 as a significant mode signal. In the selector circuit 37, to correct the composite resistance of the pull-up resistor unit 22 to the expected value 100 Ω of the composite resistance according to the correction code, one turned-on PMOS transistor or more of the switching circuit unit 23 are selected from among the turned-on PMOS transistors selected in the initial setting operation and are turned off according to the correction code to change the composite resistance of the pull-up resistor unit 22, or one turned-off PMOS transistor or more of the switching circuit unit 23 are selected from among the turned-off PMOS transistors not selected in the initial setting operation and are turned on according to the correction code to change the composite resistance of the pull-up resistor unit 22.

Thereafter, a digital measured value code and a correction code are newly produced in the decoding circuit 35, and the correction of the composite resistance of the pull-up resistor unit 22 to the expected value 100 Ω of the composite resistance is repeatedly performed by the selector circuit 37 according to the correction code newly produced. Therefore, the composite resistance of the pull-up resistor unit 22 is accurately set to the expected value 100 Ω of the composite resistance in the adjusting operation performed in this feedback loop.

After the adjusting operation is completed, because the composite resistance of the pull-up resistor unit 22 is accurately set to the expected value, a mode signal (or an insignificant mode signal) set to a high level is input to the mode setting terminal 25 in a normal operation. In this case, the PMOS transistor 26 is turned off, and an insignificant digital code is newly produced in the decoding circuit 35. This insignificant digital code produced in the decoding circuit 35 is disregarded in the latch circuit 36 in response to the mode signal of the high level to continue the outputting of the correction code obtained in the adjusting operation to the selector circuit 37. As a result, the on-off control of the selector circuit 37 for the PMOS transistors of the switching circuit unit 23 is fixedly performed so as to keep the composite resistance of the pull-up resistor unit 22 to the expected value.

Therefore, when an input signal transmitted through a transmission line (not shown) is input to the signal input terminal 24 in the normal operation, because the PMOS transistor is turned off, no influence of the input signal is exerted on the voltage-to-current converting unit 32, and the pull-up resistor unit 22 of the composite resistance accurately set to the expected value can be placed as a termination resistor for the input signal.

As is described above, in the first embodiment, because the pull-up resistor unit 22 functioning as a termination resistor is disposed on the inside of the semiconductor chip in which the receiving end device is disposed, a manufacturing cost of a data transmission system and an element disposing area of the semiconductor chip can be reduced.

Also, because the composite resistance of the pull-up resistor unit 22 functioning as a termination resistor can be accurately set to the expected value, the impedance matching of the data transmission system can be kept to a degree of the impedance matching obtained on the assumption that the termination resistor is disposed on the outside of the semiconductor chip.

Also, because the external resistor 29 is disposed on the outside of the semiconductor chip, the resistance value of the external resistor 29 can be arbitrarily changed. Therefore, a resistance value of the termination resistor indicated by the composite resistance of the pull-up resistor unit 22 can be easily adjusted while keeping a ratio of the expected value to the resistance value R2 constant.

Also, because the resistive elements of the pull-up resistor unit 22 are connected to the internal circuit of the receiving end device, the resistive elements of the pull-up resistor unit 22 can function as the termination resistor.

Embodiment 2

Figure 2:
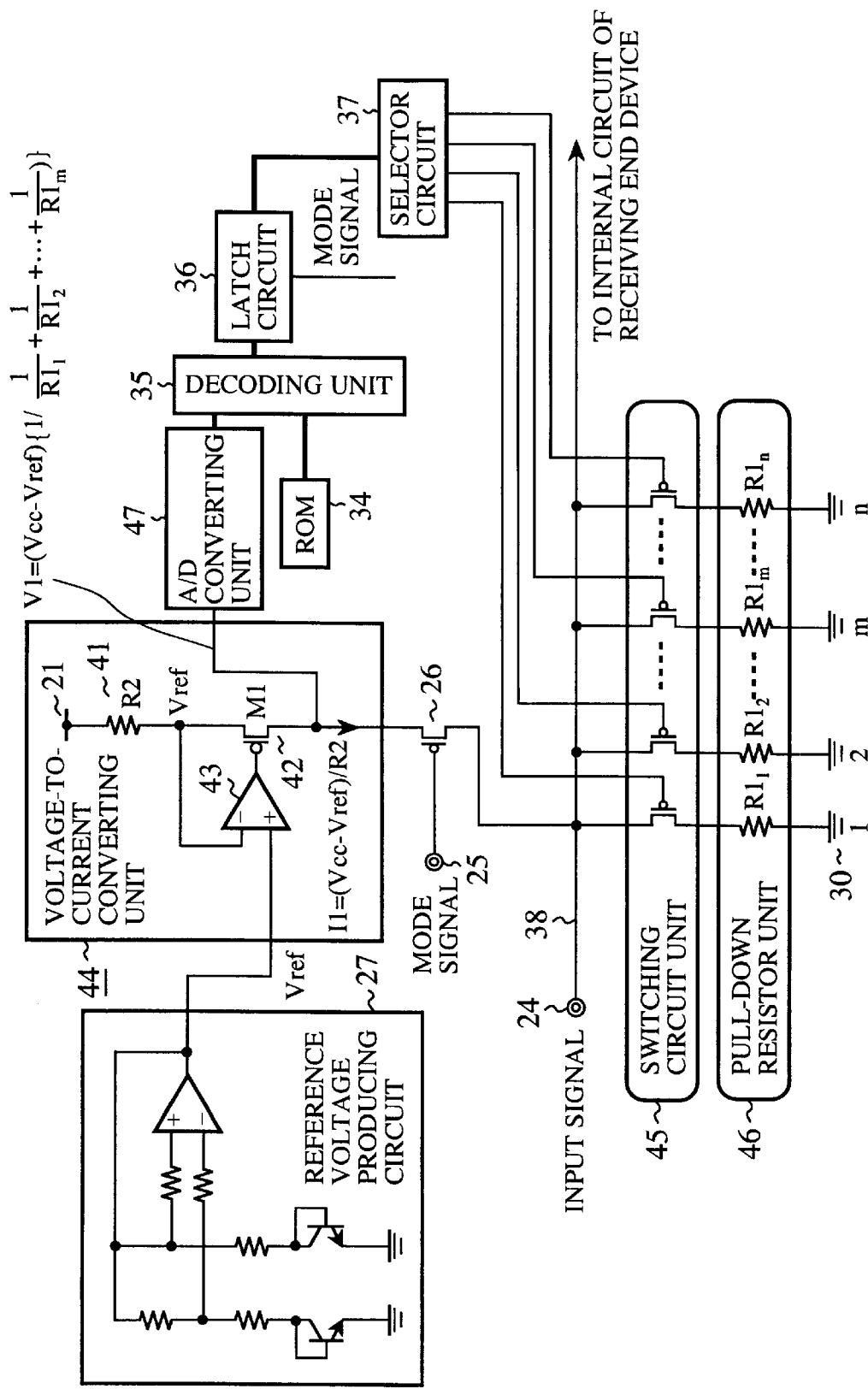
FIG. 2 is a circuit view of a resistance changing device according to a second embodiment of the present invention.

FIG. 2 is a circuit view of a resistance changing device according to a second embodiment of the present invention. The constituent elements, which are the same as those shown in FIG. 1, are indicated by the same reference numerals as those of the constituent elements shown in FIG. 1, and additional description of those constituent elements is omitted.

In FIG. 2, 41 indicates an external resistor having a resistance value R2 which is disposed on the outside of the semiconductor chip. One end of the external resistor 41 is connected to the electric power source 21. 42 indicates a PMOS transistor. A source of the PMOS transistor 42 is connected to the other end of the external resistor 41. 43 indicates an operational amplifier. A non-inversion (+) input terminal of the operational amplifier 43 is connected to the reference voltage producing circuit 27, an inversion (−) input terminal of the operational amplifier 43 is connected to a node between the external resistor 41 and the PMOS transistor 42. A voltage-to-current converting unit 44 comprises the external resistor 41, the PMOS transistor 42 and the operational amplifier 43. In the voltage-to-current converting unit 44, the reference voltage Vref produced in the reference voltage producing circuit 27 is converted into a current flowing through both the pull-down resistor unit 46 and the PMOS transistor 42 in dependence on the resistance value R2 of the external resistor 41.

45 indicates a switching circuit unit in which a plurality of PMOS transistors (or a plurality of switches) are disposed in parallel to each other. A source of each PMOS transistor is connected to the line 38 connecting the signal input terminal 24 and the internal circuit of the receiving end device (not shown). 46 indicates a pull-down resistor unit in which a plurality of resistive elements (for example, resistors) tried to be formed in the same size as each other are disposed in parallel to each other. The resistive elements have resistance values $R1_1$, $R1_2$, - - - and $R1_n$ (n denotes an integral number equal to or higher than 2) slightly different from each other, and the resistance values of the resistive elements are distributed around a desired resistance value R1. One end of each resistive element is connected to a drain of the corresponding PMOS transistor of the switching circuit unit 45, and the other end of each resistive element is connected to the ground 30.

47 indicates an analog-to-digital (A/D) converting circuit in which a node voltage V1 at the node between the PMOS transistor 26 and the PMOS transistor 42 is converted into a digital measured value code.

Next, an operation of the resistance changing device will be described below.

In the second embodiment, the pull-down resistor unit 46 is disposed on the inside of the semiconductor chip in place of the pull-up resistor unit 22 of the first embodiment, each PMOS transistor of the switching circuit unit 45 is turned on or turned off under the control of the selector circuit 37, and a desired resistance of the termination resistor is obtained.

The operation is described in detail in an example case where a prescribed number of PMOS transistors, of which the number is m (m≦n, n denotes the number of all resistive elements of the pull-down resistor unit 46, and R1/m=100 Ω), are selected from among the all PMOS transistors of the switching circuit unit 45 and are turned on to roughly set a composite resistance (R1/m) of the pull-down resistor unit 46 to 100 Ω in an initial setting operation. In other words, because each resistive element is not accurately set to the desired resistance value R1 in the manufacturing step of the pull-down resistor unit 46, the composite resistance of the resistive elements corresponding to the turned-on PMOS transistors usually differs from 100 Ω.

Therefore, an adjusting operation for accurately setting the composite resistance to the expected value (100 Ω) is performed. In detail, a mode signal (or a significant mode signal) set to a low level is input to the mode setting terminal 25. Therefore, the PMOS transistor 26 is turned on in response to the mode signal of the low level, a current I1 flowing through the pull-down resistor unit 46 passes through the PMOS transistor 26, and a node voltage V1 depending on both the current I1 and the composite resistance of the pull-down resistor unit 46 is applied to the node between the PMOS transistor 26 and the PMOS transistor 42.

Here, the reference voltage Vref output from the reference voltage producing circuit 27 is accurately set even though temperature or voltage in the reference voltage producing circuit 27 is slightly changed or constituent elements of the reference voltage producing circuit 27 are not accurately formed in the manufacturing process. Also, the external resistor 41 is disposed on the outside of the semiconductor chip. Therefore, even though the operational amplifier 43 of the voltage-to-current converting unit 44 is not accurately formed in the manufacturing process or temperature or voltage in the operational amplifier 43 is slightly changed, the node between the external resistor 41 and the PMOS transistor 42 is set to the reference voltage Vref by the function of the operational amplifier 43, and the current I1 depending on the resistance value R2 and the reference voltage Vref flows through the PMOS transistor 42. In other words, the reference voltage Vref is accurately converted into the current I1 by the operational amplifier 43. The current I1 and the node voltage V1 are expressed according to following equations.

$$I1=(Vcc-Vref)/R2$$

$$V1=I1\times\{1/(1/R1_1+1/R1_2+\cdots+1/R1_m)\}$$

Therefore, the node voltage V1 depending on the reference voltage Vref, the resistance value R2 and the composite resistance of the pull-up resistor unit 22 is expressed according to a following equation.

$$V1=(Vcc-Vref)/R2\times\{1/(1/R1_1+1/R1_2+\cdots+1/R1_m)\}$$

Thereafter, the node voltage V1 between the PMOS transistor 26 and the PMOS transistor 42 is actually measured and is converted into a digital measured value code in the A/D converting circuit 47. In the ROM circuit 34, a digital expected value code denoting an expected node voltage (Vcc−Vref)/R2×100 Ω calculated from the expected value 100 Ω of the composite resistance of the pull-down resistor unit 46 is stored in advance.

Thereafter, in the decoding circuit 35, the digital measured value code obtained from the node voltage V1 in the A/D converting circuit 47 is compared with the digital expected value code stored in the ROM circuit 34, a difference between the digital measured value code and the digital expected value code is calculated as an error value, and a correction code is produced according to the error value to correct the composite resistance of the pull-down resistor unit 46 to the expected value 100 Ω of the composite resistance according to the correction code.

Thereafter, in the latch circuit 36, the correction code obtained in the decoding circuit 35 is promptly output to the selector circuit 37 in response to the mode signal of the low level input to the mode setting terminal 25 as a significant mode signal. In the selector circuit 37, to correct the composite resistance of the pull-down resistor unit 46 to the expected value 100 Ω of the composite resistance according to the correction code, one turned-on PMOS transistor or more of the switching circuit unit 45 are selected from among the turned-on PMOS transistors selected in the initial setting operation and are turned off according to the correction code to change the composite resistance of the pull-down resistor unit 46, or one turned-off PMOS transistor or more of the switching circuit unit 45 are selected from among the turned-off PMOS transistors not selected in the initial setting operation and are turned on according to the correction code to change the composite resistance of the pull-down resistor unit 46.

Thereafter, a digital measured value code and a correction code are newly produced in the decoding circuit 35, and the correction of the composite resistance of the pull-down resistor unit 46 to the expected value 100 Ω of the composite resistance is repeatedly performed by the selector circuit 37 according to the correction code newly produced. Therefore, the composite resistance of the pull-down resistor unit 46 is accurately set to the expected value 100 Ω of the composite resistance in the adjusting operation performed in this feedback loop.

After the adjusting operation is completed, because the composite resistance of the pull-down resistor unit 46 is accurately set to the expected value, a mode signal (or an insignificant mode signal) set to a high level is input to the mode setting terminal 25 in a normal operation. In this case, the PMOS transistor 26 is turned off, and an insignificant digital code is newly produced in the decoding circuit 35. This insignificant digital code produced in the decoding circuit 35 is disregarded in the latch circuit 36 in response to the mode signal of the high level to continue the outputting of the correction code obtained in the adjusting operation to the selector circuit 37. As a result, the on-off control of the selector circuit 37 for the PMOS transistors of the switching circuit unit 45 is fixedly performed so as to keep the composite resistance of the pull-down resistor unit 46 to the expected value.

Therefore, when an input signal transmitted through a transmission line (not shown) is input to the signal input terminal 24 in the normal operation, because the PMOS transistor 26 is turned off, no influence of the input signal is exerted on the voltage-to-current converting unit 44, and the pull-down resistor unit 46 of the composite resistance accurately set to the expected value can be placed as a termination resistor for the input signal.

As is described above, in the second embodiment, because the pull-down resistor unit 46 functioning as a termination resistor is disposed on the inside of the semiconductor chip in which the receiving end device is disposed, a manufacturing cost of a data transmission system and an element disposing area of the semiconductor chip can be reduced.

Also, because the composite resistance of the pull-down resistor unit 46 functioning as a termination resistor can be accurately set to the expected value, the impedance matching of the data transmission system can be kept to a degree of the impedance matching obtained on the assumption that the termination resistor is disposed on the outside of the semiconductor chip.

Also, because the external resistor 41 is disposed on the outside of the semiconductor chip, the resistance value of the external resistor 41 can be arbitrarily changed. Therefore, a resistance value of the termination resistor indicated by the composite resistance of the pull-down resistor unit 46 can be easily adjusted while keeping a ratio of the expected value to the resistance value R2 constant.

Also, because the resistive elements of the pull-down resistor unit 46 are connected to the internal circuit of the receiving end device, the resistive elements of the pull-down resistor unit 46 can function as the termination resistor.

Embodiment 3

Figure 3:
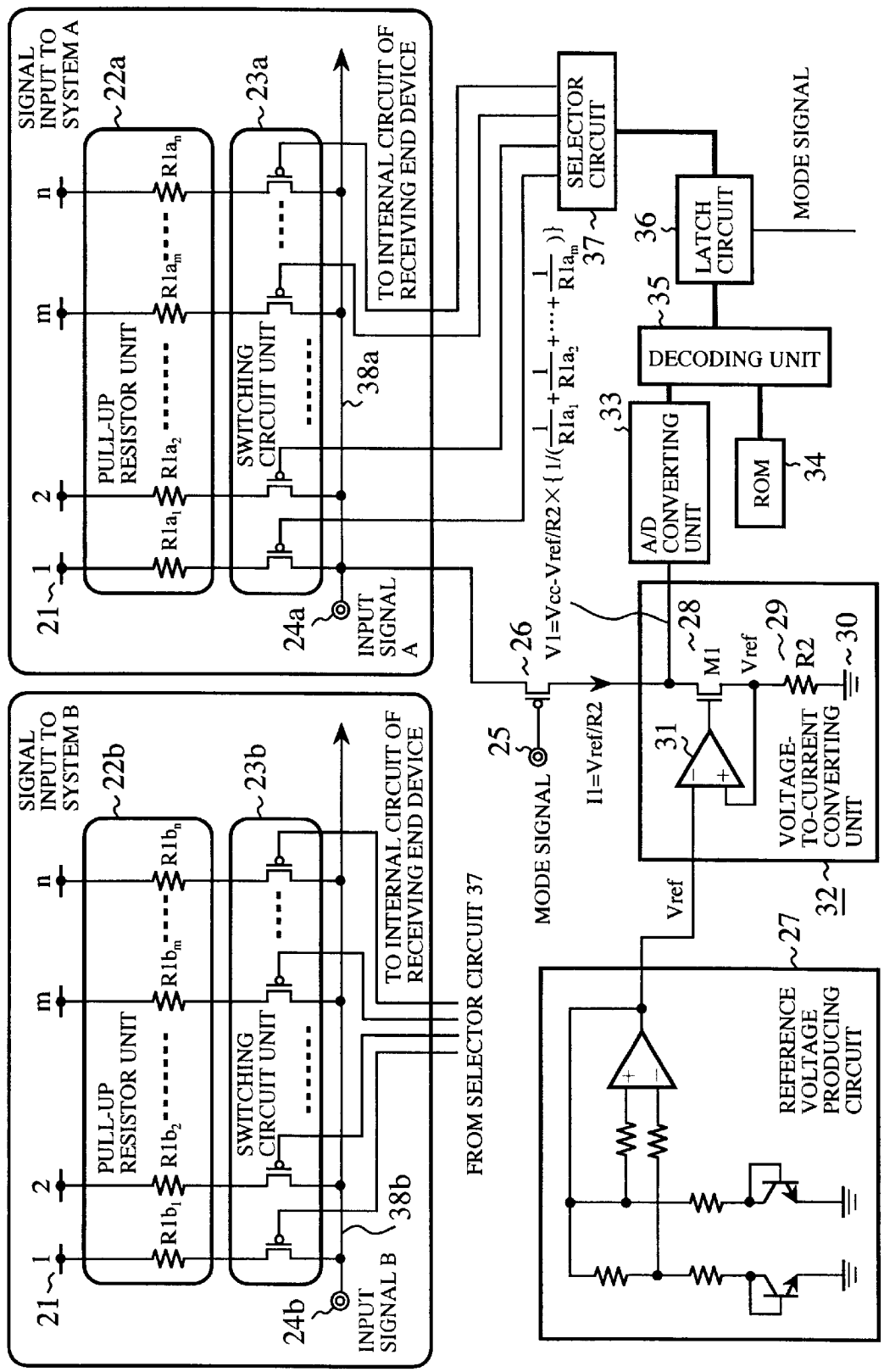
FIG. 3 is a circuit view of a resistance changing device according to a third embodiment of the present invention.

FIG. 3 is a circuit view of a resistance changing device according to a third embodiment of the present invention. The constituent elements, which are the same as those shown in FIG. 1, are indicated by the same reference numerals as those of the constituent elements shown in FIG. 1, and additional description of those constituent elements is omitted.

In FIG. 3, 22a indicates a pull-up resistor unit of a system A in which a plurality of resistive elements tried to be formed in the same size as each other are disposed in parallel to each other. The resistive elements have resistance values $R1a_1$, $R1a_2$, - - - and $R1a_n$ (n denotes an integral number equal to or higher than 2) slightly different from each other, and the resistance values of the resistive elements are distributed around a desired resistance value R1a. One end of each resistive element is connected to the electric power source 21. 23a indicates a switching circuit unit of the system A in which a plurality of PMOS transistors (or a plurality of switches) are disposed in parallel to each other. A source of each PMOS transistor is connected to the other end of the corresponding resistive element of the pull-up resistor unit 22a. 24a indicates a signal input terminal of the system A at which an input signal transmitted from a transmitting end device (not shown) through a transmission line of the system A (not shown) is received. Drains of the PMOS transistors of the switching circuit unit 23a are connected to a line 38a connecting the signal input terminal 24a and an internal circuit of a receiving end device (not shown). The receiving end device is disposed on a semiconductor chip.

22b indicates a pull-up resistor unit of a system B in which a plurality of resistive elements tried to be formed in the same size as each other are disposed in parallel to each other. The resistive elements have resistance values $R1b_1$, $R1b_2$, - - - and $R1b_n$ (n denotes an integral number equal to or higher than 2) slightly different from each other, and the resistance values of the resistive elements are distributed around a desired resistance value R1b. One end of each resistive element is connected to the electric power source 21. 23b indicates a switching circuit unit of the system B in which a plurality of PMOS transistors (or a plurality of switches) are disposed in parallel to each other. A source of each PMOS transistor is connected to the other end of the corresponding resistive element of the pull-up resistor unit 22b. 24b indicates a signal input terminal of the system B at which an input signal transmitted from the transmitting end device (not shown) through a transmission line of the system B (not shown) is received. Drains of the PMOS transistors of the switching circuit unit 23b are connected to a line 38b connecting the signal input terminal 24b and the internal circuit of the receiving end device.

A source of the PMOS transistor 26 is connected to both the line 38a and the line 38b. An on-off control is performed for each PMOS transistor of the switching circuit units 23a and 23b according to the correction code output from the latch circuit 36.

An input signal transmitted through the transmission line of the system A is received at the signal input terminal 24a under the influence of the pull-up resistor unit 22a functioning as a termination resistor of the system A, and an input signal transmitted through the transmission line of the system B is received at the signal input terminal 24b under the influence of the pull-up resistor unit 22b functioning as a termination resistor of the system B.

In the third embodiment, the receiving end device communicates with one transmitting end device through a multi-bit bus (or a plurality of transmission lines) and a plurality of signal input terminals. To simplify the description, the receiving end device communicates with one transmitting end device through a two-bit bus (or two transmission lines) and the signal input terminals 24a and 24b. Also, the configuration and layout of the pull-up resistor unit 22b and the switching circuit unit 24b in the system B is the same as that of the pull-up resistor unit 22a and the switching circuit unit 24a in the system A. That is to say, the combination of the pull-up resistor unit 22b and the switching circuit unit 24b in the system B is a replica circuit of the combination of the pull-up resistor unit 22a and the switching circuit unit 24a in the system A. Therefore, an operation in the pull-up resistor unit 22b and the switching circuit unit 24b is substantially the same as that in the pull-up resistor unit 22a and the switching circuit unit 24a, and data transmission characteristics in the pull-up resistor unit 22b and the switching circuit unit 24b are substantially the same as those in the pull-up resistor unit 22a and the switching circuit unit 24a.

Next, an operation of the resistance changing device will be described below.

A prescribed number of PMOS transistors, of which the number is m (m≦n, n denotes the number of all resistive elements of the pull-up resistor unit 22a, and R1/m=100 Ω), are selected from among the all PMOS transistors of the switching circuit unit 23a and are turned on under the control of the selector circuit 37 to roughly set a composite resistance of the pull-up resistor unit 22a to an expected value in an initial setting operation of the system A. Thereafter, the composite resistance of the pull-up resistor unit 22a is accurately set to the expected value in an adjusting operation of the system A in the same manner as in the first embodiment.

Thereafter, an initial setting operation of the system B and an adjusting operation of the system B are performed for the pull-up resistor unit 22b in the same manner as those of the system A.

In the third embodiment, the pull-up resistor unit 22a of the system A and the pull-up resistor unit 22b of the system B are respectively similar to the pull-up resistor unit 22 of the first embodiment. Therefore, the initial setting operation and the adjusting operation for the systems A and B are performed in the same manner as in the first embodiment. However, it is applicable that a pull-down resistor unit of the system A and a pull-down resistor unit of the system B respectively similar to the pull-down resistor unit 46 of the second embodiment be disposed in the resistance changing device and the initial setting operation and the adjusting operation for the systems A and B be performed in the same manner as in the second embodiment.

Also, in the third embodiment, the resistance changing device corresponds to a two-bit bus (or two transmission lines). However, it is applicable that a plurality of sets of the pull-up resistor units and the switching circuit units be disposed in the resistance changing device so as to correspond to a multi-bit bus of three bits or more (or a plurality of transmission lines of which the number is equal to or higher than 3). In this case, each set can be formed as a replica circuit of the set of the pull-up resistor unit 22 and the switching circuit unit 23.

As is described above, in the third embodiment, even though a plurality of transmission lines (or a multi-bit bus) are connected to the receiving end device, the set of the pull-up resistor unit 22 and the switching circuit unit 23 or the set of the pull-down resistor unit 46 and the switching circuit unit 45 corresponding to each transmission line is disposed in resistance changing device. Therefore, the resistance value of the termination resistor corresponding to each transmission line can be appropriately adjusted to the expected value.

Embodiment 4

Figure 4:
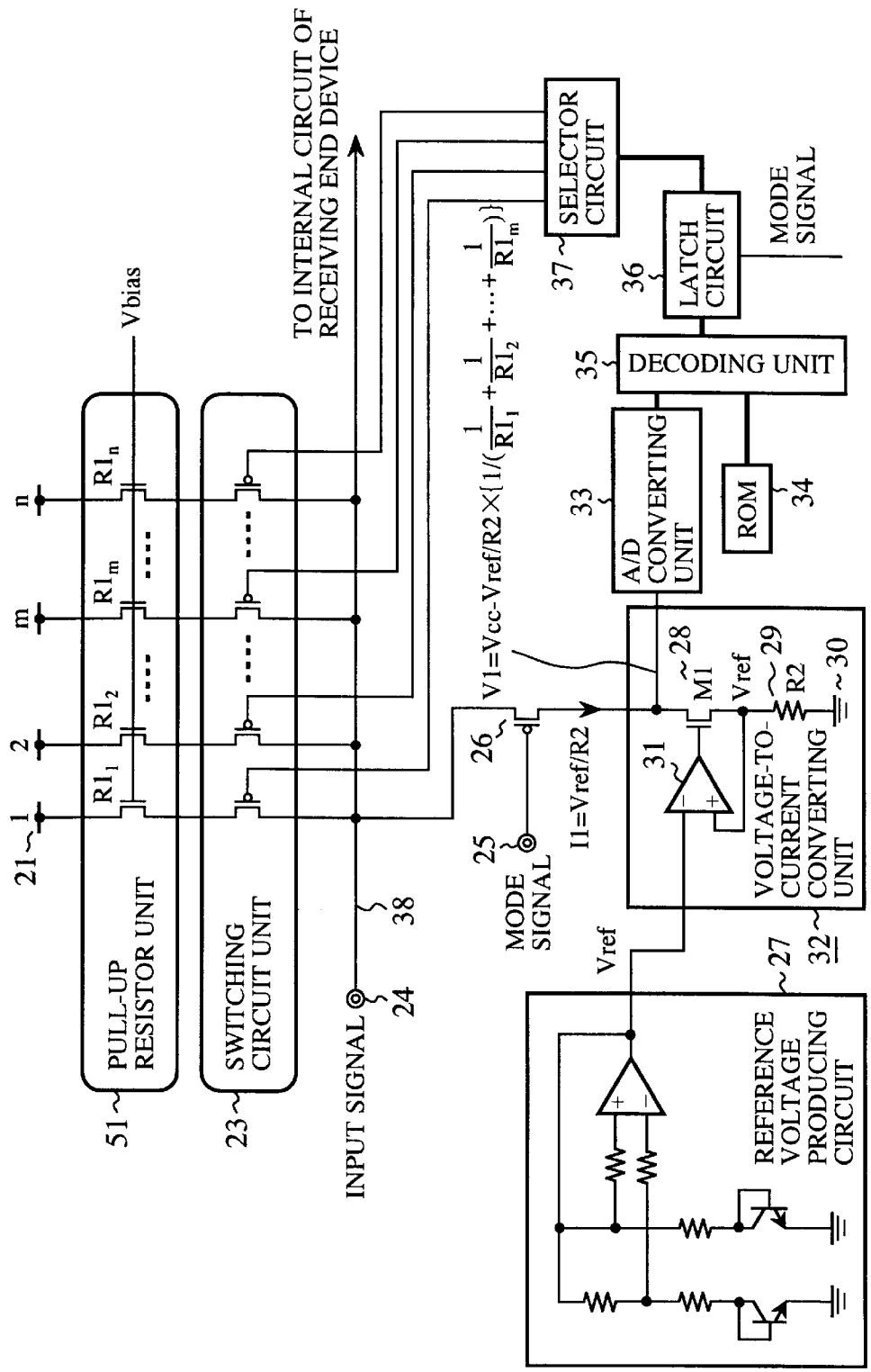
FIG. 4 is a circuit view of a resistance changing device according to a fourth embodiment of the present invention.

FIG. 4 is a circuit view of a resistance changing device according to a fourth embodiment of the present invention. The constituent elements, which are the same as those shown in FIG. 1, are indicated by the same reference numerals as those of the constituent elements shown in FIG. 1, and additional description of those constituent elements is omitted.

In FIG. 4, 51 indicates a pull-up resistor unit in which a plurality of NMOS transistors, of which the number is n (n denotes an integral number equal to or higher than 2), are disposed in parallel to each other. One end of each NMOS transistor is connected to the electric power source 21, and the other end of each NMOS transistor is connected to the corresponding PMOS transistor of the switching circuit unit 23. Also, a bias voltage Vbias is applied to a gate of each NMOS transistor to turn on the NMOS transistor. Though the NMOS transistors are tried to be formed in the same size as each other, resistance values of the NMOS transistors turned on are slightly different from each other and are distributed around a desired resistance value R1.

Next, an operation of the resistance changing device will be described below.

The bias voltage Vbias is applied to the gates of the NMOS transistors, and the NMOS transistors are turned on. Therefore, the NMOS transistors turned on have resistance values $R1_1$, $R1_2$, - - - and $R1_n$ (n denotes an integral number equal to or higher than 2) slightly different from each other.

Thereafter, the composite resistance of the pull-up resistor unit 51 is accurately set to the expected value in the same manner as in the first embodiment.

Accordingly, in the fourth embodiment, the same effects as those obtained in the first embodiment can be obtained. Also, an area occupied by the pull-up resistor unit 51 on the semiconductor chip can be reduced as compared with that in the first embodiment.

In the fourth embodiment, the ends of the NMOS transistors of the pull-up resistor unit 51 are connected to the electric power source 21 in the same manner as the ends of the resistive elements of the pull-up resistor unit 22 in the first embodiment. However, it is applicable that the ends of the NMOS transistors of the pull-up resistor unit 51 be connected to the ground GND in the same manner as the ends of the resistive elements of the pull-down resistor unit 46 in the second embodiment. In this case, the same effects can be obtained.

Also, in the fourth embodiment, the pull-up resistor unit 51 has the NMOS transistors. However, it is applicable that the pull-up resistor unit 51 be composed of a plurality of PMOS transistors. In this case, a signal of a low level is input to a gate of each PMOS transistor of the pull-up resistor unit 51 to turn on the PMOS transistor.

Embodiment 5

Figure 5:
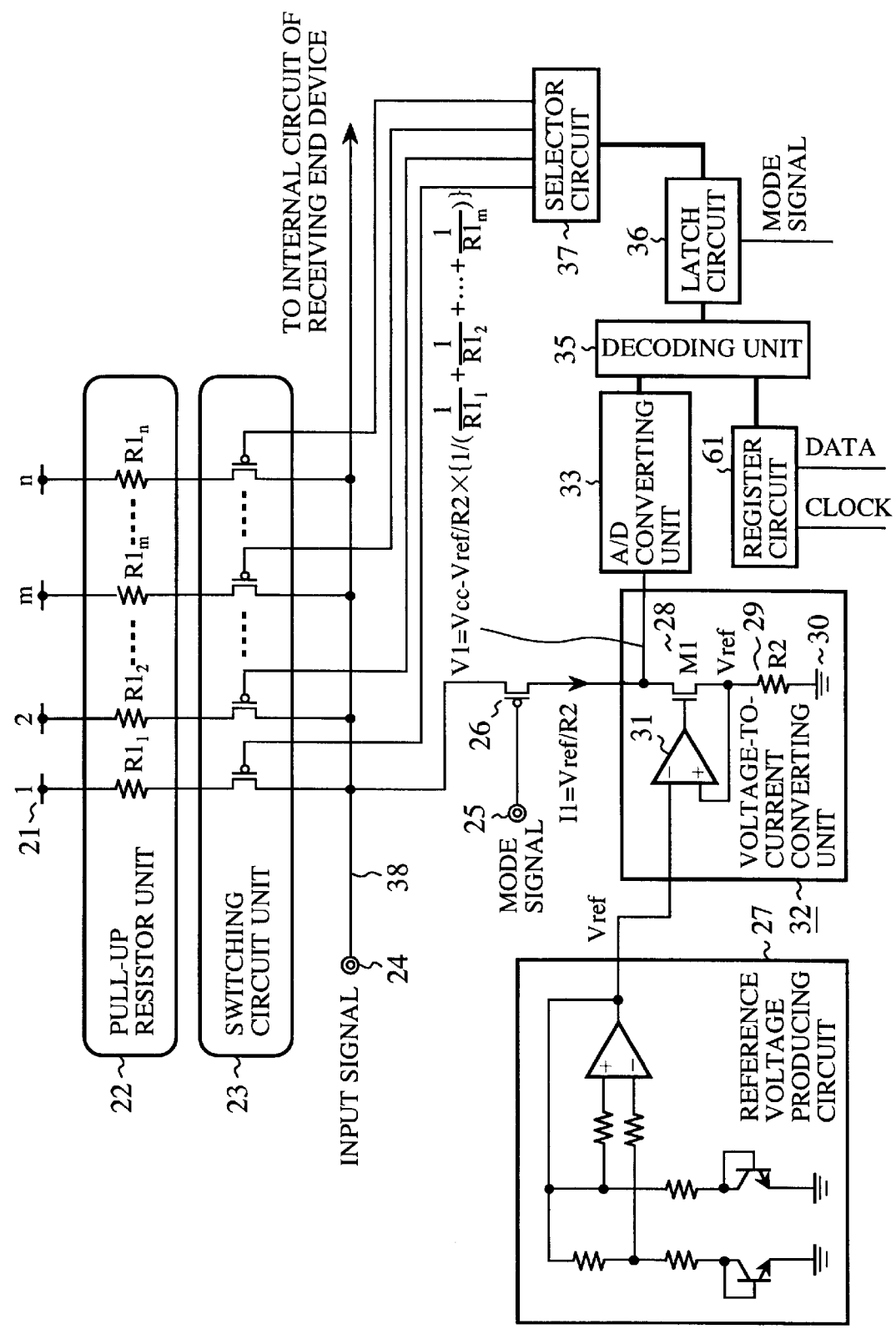
FIG. 5 is a circuit view of a resistance changing device according to a fifth embodiment of the present invention.
Figure 6:
FIG. 6 is a view of an equivalent circuit of a conventional data transmission system.
Figure 7:
FIG. 7 is a view of an equivalent circuit of another conventional data transmission system.
Figure 8:
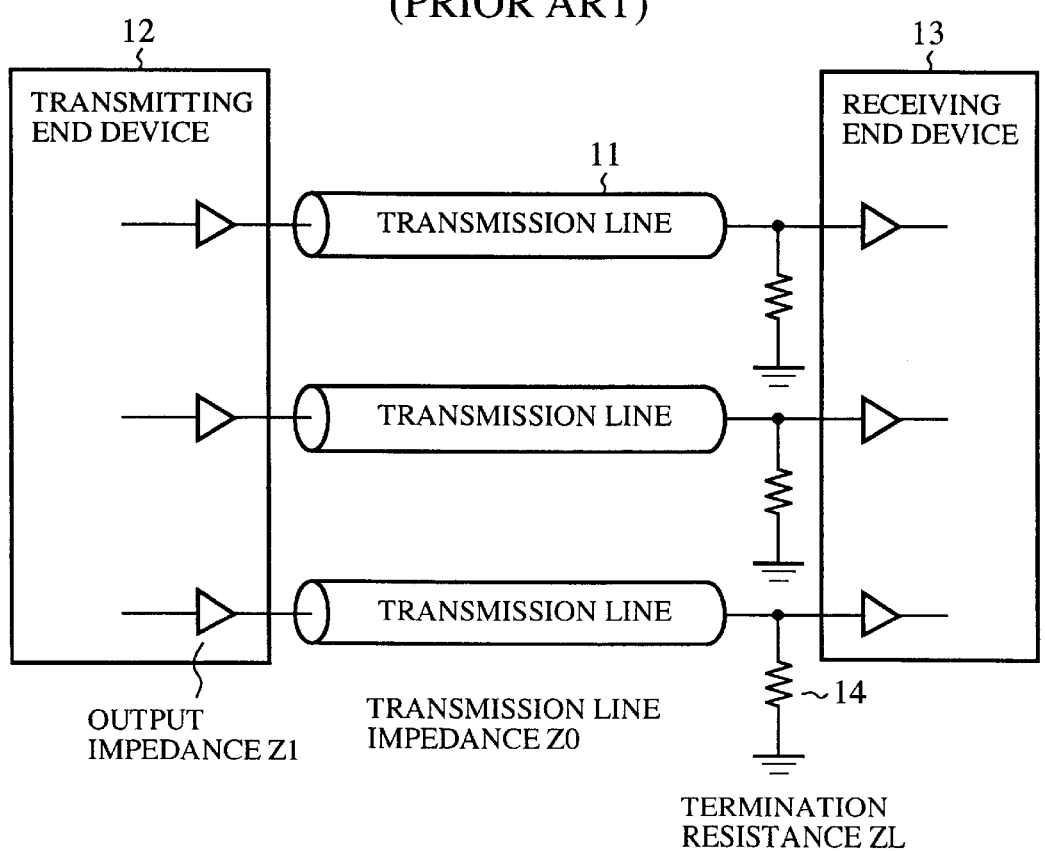
FIG. 8 is a view of an equivalent circuit of a conventional data transmission system in which impedance matching is performed.

FIG. 5 is a circuit view of a resistance changing device according to a fifth embodiment of the present invention. The constituent elements, which are the same as those shown in FIG. 1, are indicated by the same reference numerals as those of the constituent elements shown in FIG. 1, and additional description of those constituent elements is omitted.

In FIG. 5, 61 indicates a register circuit (or an expected value holding unit) in which a digital expected value code is held. The digital expected value code denotes an expected value of a composite resistance of the pull-up resistor unit 22. The digital expected value code arbitrarily set on the outside can be directly written in the register circuit 61.

Next, an operation of the resistance changing device will be described below.

In the first to fourth embodiments, the digital expected value code is stored in advance in the ROM circuit 34. However, in the fifth embodiment, the digital expected value code is arbitrarily set on the outside and is directly written in the register circuit 61.

Accordingly, the composite resistance of the pull-up resistor unit 22 can be changed to the expected value arbitrarily set as a termination resistance.

In the fifth embodiment, the ends of each resistive element of the pull-up resistor unit 22 are connected to the electric power source 21 in the same manner as in the first embodiment. However, it is applicable that the ends of each resistive element of the pull-down resistor unit 46 be connected to the ground GND in the same manner as in the second embodiment. In this case, the same effects can be obtained.

What is claimed is:

1. A resistance changing device comprising:
    a pull-up resistor unit having a plurality of resistive elements of which first ends are connected to a high electric potential source;
    a switching circuit unit having a plurality of switches of which first ends are connected to second ends of the resistive elements of the pull-up resistor unit respectively and second ends are connected to a signal input terminal;

a mode switch of which a first end is connected to the signal input terminal and which is switched on in response to a significant mode signal input to a mode setting terminal and is switched off in response to an insignificant mode signal input to the mode setting terminal;

a reference voltage producing circuit for producing a reference voltage;

a voltage-to-current converting unit, which has an NMOS transistor having a drain connected to a second end of the mode switch, an external resistor disposed outside a chip and having both an end connected to a source of the NMOS transistor and another end connected to a low electric potential source and an operational amplifier having a first input terminal connected to the reference voltage producing circuit, a second input terminal connected to a node between the NMOS transistor and the external resistor and an output terminal connected to a gate of the NMOS transistor, for converting the reference voltage received by the operational amplifier from the reference voltage producing circuit into a current flowing through the NMOS transistor according to a resistance value of the external resistor;

an analog-to-digital converting circuit for converting a node voltage at a node between the mode switch and the NMOS transistor of the voltage-to-current converting unit into a digital measured value code;

an expected value holding unit for holding a digital expected value code denoting an expected value of a composite resistance of the pull-up resistor unit;

a decoding circuit for producing a correction code according to both the digital measured value code obtained by the analog-to-digital converting circuit and the digital expected value code held by the expected value holding unit;

a latch circuit for outputting the correction code produced by the decoding circuit in response to the significant mode signal input to the mode setting terminal and disregarding the correction code in response to the insignificant mode signal input to the mode setting terminal; and a selector circuit for performing an on-off control for each of the switches of the switching circuit unit according to the correction code output from the latch circuit so as to correct the composite resistance of the pull-up resistor unit to the expected value.

2. A resistance changing device according to claim 1, further comprising:

a replica circuit connected to a second signal input terminal and having the same configuration as a set of the pull-up resistor unit and the switching circuit unit, wherein the first end of the mode switch is connected to the second signal input terminal, and an on-off control for each of a plurality of switches of the replica circuit is performed by the selector circuit so as to correct a composite resistance of the replica circuit to an expected value.

3. A resistance changing device according to claim 1, wherein the resistive elements of the pull-up resistor unit are formed of a plurality of MOS transistors, and the MOS transistors turned on have resistances respectively.

4. A resistance changing device according to claim 1, wherein the expected value holding unit is formed of a register circuit, and the digital expected value code arbitrarily set is held in the register circuit.

5. A resistance changing device comprising:

a reference voltage producing circuit for producing a reference voltage;

a voltage-to-current converting unit, which has an external resistor disposed outside a chip and having a first end connected to a high electric potential source, a PMOS transistor having a source connected to a second end of the external resistor and an operational amplifier having a first input terminal connected to a node between the PMOS transistor and the external resistor, a second input terminal connected to the reference voltage producing circuit, and an output terminal connected to a gate of the PMOS transistor, for converting the reference voltage received by the operational amplifier from the reference voltage producing circuit into a current flowing through the PMOS transistor according to a resistance value of the external resistor;

a mode switch of which a first end is connected to a drain of the PMOS transistor of the voltage-to-current converting unit and a second end is connected to a signal input terminal and which is switched on in response to a significant mode signal input to a mode setting terminal and is switched off in response to an insignificant mode signal input to the mode setting terminal;

a switching circuit unit having a plurality of switches of which first ends are connected to the signal input terminal;

a pull-down resistor unit having a plurality of resistive elements of which first ends are connected to second ends of the switches of the switching circuit unit respectively and second ends are connected to a low electric potential source;

an analog-to-digital converting circuit for converting a node voltage at a node between the mode switch and the PMOS transistor of the voltage-to-current converting unit into a digital measured value code;

an expected value holding unit for holding a digital expected value code denoting an expected value of a composite resistance of the pull-down resistor unit;

a decoding circuit for producing a correction code according to both the digital measured value code obtained by the analog-to-digital converting circuit and the digital expected value code held by the expected value holding unit;

a latch circuit for outputting the correction code produced by the decoding circuit in response to the significant mode signal input to the mode setting terminal and disregarding the correction code in response to the insignificant mode signal input to the mode setting terminal; and a selector circuit for performing an on-off control for each of the switches of the switching circuit unit according to the correction code output from the latch circuit so as to correct the composite resistance of the pull-down resistor unit to the expected value.

6. A resistance changing device according to claim 5, further comprising:

a replica circuit connected to a second signal input terminal and having the same configuration as a set of the pull-down resistor unit and the switching circuit unit, wherein the second end of the mode switch is connected to the second signal input terminal, and an on-off control for each of a plurality of switches of the replica circuit is performed by the selector circuit so as to correct a composite resistance of the replica circuit to an expected value.

7. A resistance changing device according to claim 5, wherein the resistive elements of the pull-down resistor unit are formed of a plurality of MOS transistors, and the MOS transistors turned on have resistances respectively.

8. A resistance changing device according to claim 5, wherein the expected value holding unit is formed of a register circuit, and the digital expected value code arbitrarily set is held in the register circuit.

* * * * *